United States Patent [19]

Tseng et al.

[11] Patent Number: 5,433,852
[45] Date of Patent: Jul. 18, 1995

[54] METHOD FOR MODIFYING PVC SEPARATION MEMBRANES

[75] Inventors: Tsai-Wie Tseng; Tze-Chiang Chiao, both of Hsinchu; Chin-Chih Chou, Miao-li Hsuan, all of Taiwan

[73] Assignee: Industrial Technology Research Institute, Hsinchu, Taiwan

[21] Appl. No.: 116,251

[22] Filed: Sep. 2, 1993

[51] Int. Cl.$^6$ .............................................. B01D 39/00
[52] U.S. Cl. ........................... 210/500.37; 210/500.27; 210/500.23; 210/500.42; 210/490; 210/506; 210/500.39; 264/48; 264/49; 427/245
[58] Field of Search ............... 210/500.27, 500.42, 210/500.23, 500.35, 500.21, 490, 506, 500.39; 264/48, 41, 49; 525/102; 427/245

[56] References Cited

U.S. PATENT DOCUMENTS

| | | | |
|---|---|---|---|
| 4,322,381 | 3/1982 | Joh | 210/500.42 |
| 5,019,261 | 5/1991 | Stengaard | 210/490 |
| 5,283,288 | 2/1994 | Boden et al. | 525/102 |

OTHER PUBLICATIONS

F. Vigo et al., "Poly(Vinyl Chloride) Ultrafiltration Membranes Modified by High Frequency Discharge Treatment," *Journal of Membrane Science,* 36 (1988) 187–199.

F. Vigo et al., "Ultrafiltration Membranes Obtained by Poly(Acrylonitrile) Grafted onto Poly(Vinylchloride)," *Desalination,* 70 (1988), 277–292.

F. Vigo et al., "Ultrafiltration Membranes Obtained by Chemical Modification of Poly(Vinyl Chloride)," *Synthetic Polymeric Membranes,* (1987), 203–212.

C. Friedrich et al., "Asymmetric Reverse Osmosis and Ultrafiltration Membranes Prepared from Sulfonated Polysulfone," *Desalination,* 36 (1981), 39–62.

*Primary Examiner*—Robert A. Dawson
*Assistant Examiner*—Ana M. Fortuna
*Attorney, Agent, or Firm*—Darby & Darby

[57] ABSTRACT

A modified polyvinyl chloride (PVC) separation membrane and a method for its preparation. The membrane has improved water permeability, contamination resistance, and hydrophilic properties. The method comprises contacting a PVC membrane with a treating solution containing a compound having an amino functional group, preferably in the presence of an alkali alcoholate catalyst, and heat-treating the PVC membrane at elevated temperature. The membrane can be dipped in the treating bath at high temperature or dipped in solution at room temperature and heat-treated after removal from the treating bath.

14 Claims, 1 Drawing Sheet

METHOD FOR MODIFYING PVC SEPARATION MEMBRANES

BACKGROUND OF THE INVENTION

The present invention relates to a method for modifying a polyvinyl chloride (referred to hereinafter as "PVC") membrane to improve its properties.

Membrane separation processes have become an important unit operation in the chemical industry due to their many advantages. Commercially available separation membranes include cellulose acetate, polysulfone, polyvinylidene fluoride, polyamide, polyimide, polyvinyl alcohol, and polyvinyl chloride. Since PVC resin has excellent chemical resistance and is inexpensive, it is extensively utilized as a high-performance separation membrane. PVC, however, is a hydrophobic material, and the water flux of PVC separation membranes is not high. In addition, it is easy for impurities such as colloids to form sediment on the surface of the membrane during separation operations, resulting in a rapid decrease of the water flux of the membrane.

The most direct and efficient method to overcome these drawbacks is to increase the hydrophilic property of the PVC separation membrane. Several modifying methods have been proposed in the prior art literature. For example: (1) *The Journal of Membrane Science*, 36 (1988) 187-199, discloses a high frequency discharge process to modify the PVC membrane with inorganic $O_2$, $N_2$, $H_2$, or He atmospheres to enhance the PVC membrane properties. (2) As reported in *Desalination*, 70 (1988) 277-292, a $Co^{60}$ gamma-ray is utilized to graft acrylonitrile onto the PVC, and a phase inversion process is further utilized to prepare the modified PVC separation membrane. This process improves the permeation and separation characteristics of the membrane. (3) In the book entitled *Synthetic Polymeric Membranes*, Walter de Gruyter & Co., Berlin, Germany, pp. 203-212 (1987), it is mentioned that F. Vigo, C. Uliana and R. Pedemonte utilized a homogeneous heat treatment or a peracetic acid chemical treatment to modify PVC. The modified PVC is then dissolved in N,N-dimethylformamide (DMF) to form a membrane casting solution. The casting solution is used to produce a modified PVC separation membrane by a phase inversion process. Since the resultant membrane has hydroxyl or acetate groups by virtue of the modification of the PVC resin, the hydrophilic property of the membrane is enhanced and the performance of the separation membrane improved.

The above-mentioned methods (1) and (2) are, however, unsuitable for mass production and commercialization, as well as being expensive. In method (3), the PVC resin is subject to a cross-linking reaction during the heat treatment process. This will decrease the solubility of the modified PVC resin in the solvent and adversely affect the preparation of the casting solution. In addition, the modified PVC resin product can be used only after being subjected to complicated purification processes. There thus is a need for a simplified method for improving the properties of polyvinyl chloride separation membranes.

SUMMARY OF THE INVENTION

The primary object of the present invention is to provide a method for modifying PVC membranes so as to overcome the above-described drawbacks and thereby prepare a high-performance separation membrane. The hydrophilic property of the PVC membrane is improved by a heat treatment.

In accordance with the invention, the PVC membrane is first prepared by phase inversion in a customary manner. The resultant PVC membrane is then contacted with a solution containing a compound or polymer having an amino functional group. The membrane is further heat-treated either by performing the contact step in a bath at elevated temperature or by a subsequent heat treatment step.

The present invention will be more fully understood by reference to the following description and accompanying drawings, which form an integral part of this application. Unless otherwise indicated, all percentages or amounts disclosed are on a weight basis.

DETAILED DESCRIPTION OF THE INVENTION

Figure 2:
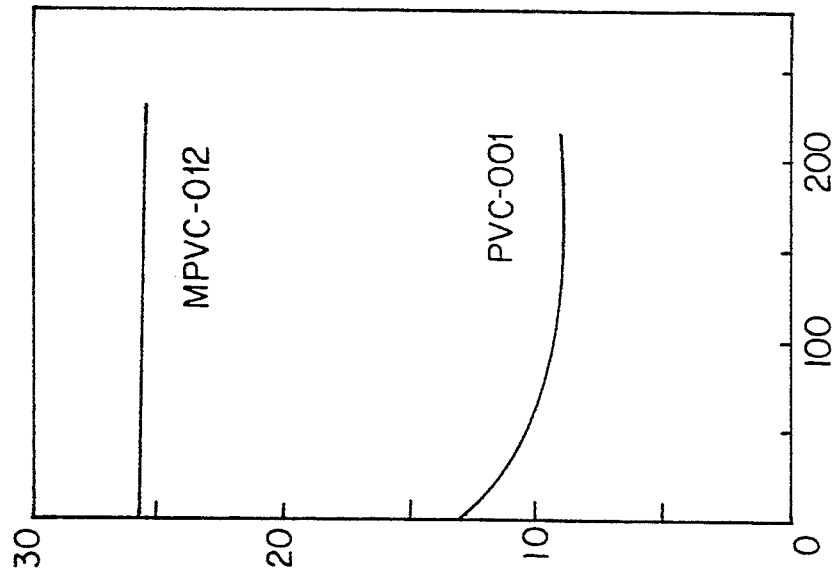
FIG. 2 compares the water permeability of an unmodified membrane (PVC-001) with that of another modified membrane (MPVC-012) prepared according to the present invention (Example 2).

The membrane of the invention is first prepared by dissolving the PVC resin in an organic solvent to form a casting solution, filtering and defoaming the casting solution, and coating the prepared casting solution onto a woven or nonwoven fabric. After a period of evaporation time, e.g., 1 to 30 seconds, the coated membrane is dipped in a gelation medium, usually cold water, to form a separation membrane. In accordance with the present invention, the PVC separation membrane is then contacted with an alcoholic or aqueous solution containing an amine compound or amine polymer. The contact may be by dipping the membrane or by other means. An appropriate alkali alcoholate (RO—M' where R is a $C_1$ to $C_5$ alkyl and M' an alkali metal) may be added to the solution to act as a catalyst. The membrane in contact is then heated and reacts with the treating solution so as to form a modified hydrophilic PVC membrane.

The above-mentioned solvent may be any conventional solvent known in the art for dissolving a PVC membrane. Examples include N,N-dimethylformamide, tetrahydrofuran, N-methyl-2-pyrrolidine, dimethylsulfoxide, N,N-dimethylacetamide or Y-butyrolactone, in which the PVC resin is soluble. Two or more kinds of the solvents may be mixed. A solvent wherein PVC resin is insoluble or only slightly soluble may be added. In preparing the casting solution, the solids content of the PVC resin is between 6 and 15 wt. %.

The gelation medium may be water, or an organic solvent in which the PVC resin does not dissolve, such as methanol, ethanol, propanol, or isopropanol. The gelation temperature is generally between 10° and 30° C., and preferably room temperature. Prior to gelation, evaporation of solvent is permitted to occur. The evaporation time is between 1 and 100 seconds, and preferably between 8 and 20 seconds.

The foregoing steps for forming a PVC separation membrane are conventional and described in references such as: Synthetic Polymeric Membranes, Walter de Grayter & Co., Berlin, Germany, pp 193–202 (1987); Journal of Applied Polymer Science, Vol. 26, pp. 1039–1048 (1981), which are hereby incorporated by reference.

Modification of the PVC membrane with an amine is the crux of the present invention. The amine used may be a primary, secondary, or tertiary amine. It may be a mono-functional or multi-functional amino compound. In addition, the amine may be a monomer, oligomer, or polymer. Examples of amine compounds include: $C_1$ to $C_{10}$ alkyl amines such as ethylamine, propylamine, and isopropylamine; $C_1$ to $C_{10}$ alkyl diamino compounds, such as 1,3-propane diamine, 1,4-butane diamine, 1,6-hexane diamine, methylhydrazine, ethylenediamine; or pyridine.

Examples of amine polymers include poly-4-ethenyl pyridine, polyethylenimine and polyvinylimidozole.

The concentration of amine in the treating solution is 0.1–50 wt. %, and preferably 0.5–10 wt. %. Preferably, the solution will contain a catalyst of alkali alcoholate such as $CH_3ONa$, $C_2H_5ONa$ in a concentration of 0.05–10 wt. %, preferably 0.2–5 wt. %. The solvent for the amine solution is normally water, or an alcohol such as ethyl alcohol, 1-propanol isopropanol, or butanol. $C_1$ to $C_4$ alkyl alcohols are preferred.

The post-solution contact heat treatment temperature for modification of the PVC membrane is between 25° and 120° C., preferably 40°–100° C. The heat treatment may be effected by immersing the separation membrane in an amine solution or bath at such elevated temperatures. Alternatively, the separation membrane may first be dipped in, or coated with, the amine solution at room temperature, and then heated to 25°–120° C. for the modification reaction.

The PVC separation membrane may constitute a multiple of modules. Alternatively, the modification method of the present invention may be used to provide a basic PVC membrane module, such as a plate or flat film frame, spiral wound tubular or hollow fiber. The amine solution is pumped into the module so that the modifying reaction takes place within the module itself. The modification increases the surface hydrophilicity of the PVC separation membrane so that the water flux of the separation membrane is increased. In addition, it also alleviates the surface fouling phenomenon and thus reduces or eliminates the flux decline problem experienced after a long period of use. The modified PVC separation membrane can be used not only for conventional applications, but also in fields where the substance to be separated or concentrated has an electric charge. For example, it can be applied to the recycling of electro-deposition paint, dyestuff concentration, and separations in biochemical processes.

To better understand the present invention, one comparative example and four examples of the modification of PVC membranes are set forth. In the examples, water permeability or flux is denoted as GFD (gal/ft$^2$/day). It was measured by the test described in Journal of Applied Polymer Science, Vol. 14, (1970), pp. 1197–1214, which is hereby incorporated by reference.

Comparative Example—Base PVC Membrane

Figure 1:
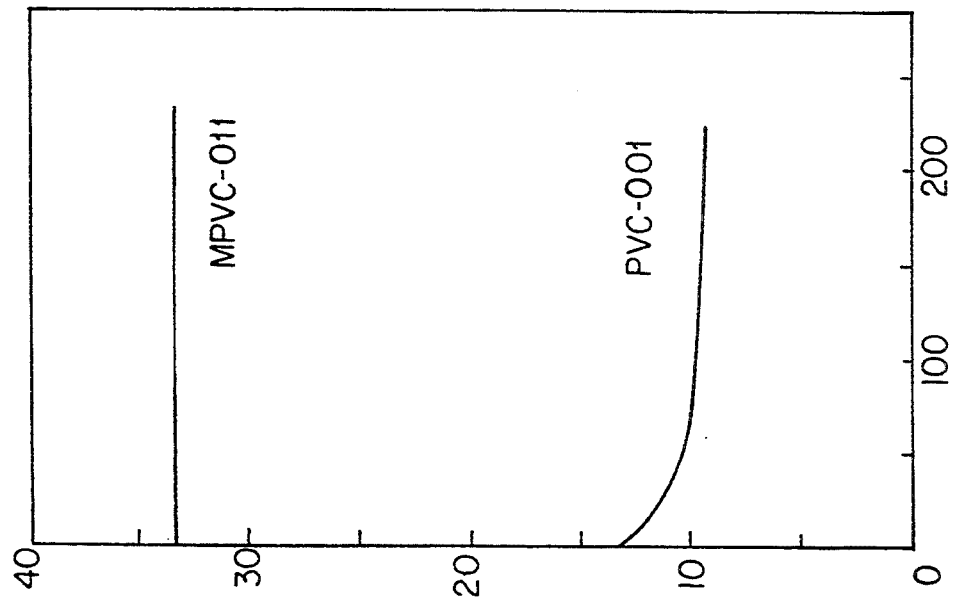
FIG. 1 compares the water permeability of an unmodified membrane (PVC-001) with that of a modified membrane (MPVC-011) prepared according to the present invention (Example 1).

A PVC resin powder having an average degree of polymerization of 1000 was dissolved in N, N-dimethylformamide to form a casting solution having a concentration of 10 wt. % PVC polymer. After filtering and defoaming, the casting solution was coated on a nonwoven fabric with a glass rod. After about 15 seconds, the fabric coated with the casting film was dipped in water to gel the membrane. The resultant membrane was represented by a reference number PVC-001. Its performance was measured by a sheet ultrafiltration test apparatus. The testing solution was a 20 wt. % cation electro-deposition paint. The testing pressure was 30 psi and the temperature was 25° C. The measured water flux of the membrane was 13 GFD. The separation membrane was tested for an extended period of time (220 hours) and the results are shown in FIG. 1. The figure shows that the water flux decreased rapidly. This is due to the fouling of the membrane.

EXAMPLE 1

The base PVC membrane of the Comparative Example was modified according to the present invention. It was dipped in an ethyl alcohol solution containing 1 wt. % poly(4-ethenyl pyridine) at 70° C. for 2 hours. Finally, the PVC membrane was removed and heated at 70° C. for 2 hours in an oven. It was then cleaned several times with the ethyl alcohol. The modified PVC membrane is denoted No. MPVC-011.

The modified membrane was tested in the same manner and under the same conditions as described in the Comparative Example. The measured water flux was 33 GFD. As shown in FIG. 1, the water flux of the modified membrane was nearly threefold (33 vs. 13) that of the unmodified membrane. The modified membrane also had excellent fouling resistance and maintained an essentially constant water flux for the test period of 220 hours.

EXAMPLE 2

The PVC membrane used in this example was the same as the base PVC membrane described above in the Comparative Example. The membrane was then dipped into a methanol solution containing 10 wt. % polyethylenimine and 5 wt. % sodium methoxide at 70° C. for 5 hours. The treated membrane was then removed and cleaned several times with the distilled water. The thus modified PVC membrane was denoted as No. MPVC-012.

The modified membrane was tested in the same manner and under the same process conditions used in the Comparative Example. The measured water flux of the modified membrane was 26 GFD. As shown in FIG. 2, the water flux of the modified membrane was twice that of the unmodified membrane and was unchanged after 200 hours operation (whereas the latter decreased significantly). This demonstrates that the modified membrane had an excellent resistance to fouling.

EXAMPLE 3

The PVC membrane used in this example was the same as the base PVC membrane described above and was made by the same process described in the Comparative Example. The membrane was dipped into a methanol solution containing 5 wt. % N,N,N',N'-tetramethyl-1,6-hexane diamine and 1 wt. % sodium methoxide (as catalyst) at 70° C. for 4 hours. The PVC membrane was withdrawn from the solution and cleaned several times with distilled water. The modified PVC membrane is denoted as No. MPVC-013.

The modified membrane was tested in the same manner and under the same process conditions as used in the Comparative Example. The measured water flux of the modified membrane was 24 GFD.

EXAMPLE 4

This example is essentially the same as Example 1, except that the modifying solution was 3 wt. % 4-ethenyl pyridine and the dipping time 4 hours. The resultant membrane was denoted as No. MPVC-014 and subjected to the same permeability test procedures as described above. The measured water flux thereof was 34 GFD.

As shown in the above examples, the present invention produced modified PVC membranes having water fluxes in the range of 24 to 34, as compared to the unmodified PVC membrane which had a water flux of 13. This represents an 85 to 260% improvement.

While the invention has been described in terms of what are presently considered to be the most practical and preferred examples, patent coverage is not limited thereto. Various modifications within the spirit and scope of the appended claims will be apparent to those skilled in the art.

What is claimed is:

1. A method for modifying a polyvinyl chloride(PVC) separation membrane comprising the steps of contacting a PVC membrane with a solution containing a compound having an amino functional group and from 0.05 to 10 wt. % of an alkali alcoholate as a catalyst and heat-treating said membrane at a temperature of 25° to 120° C.

2. The method of claim 1 wherein said amino compound is a organic amine selected from the group consisting of primary, secondary, and tertiary amines.

3. The method of claim 2 wherein the organic amine is a $C_1$–$C_{10}$ alkyl amine or a $C_1$–$C_{10}$ alkyl diamino compound.

4. The method of claim 1 wherein the solvent in said solution is alcohol or water.

5. The method of claim 4 wherein said amino compound is used at a concentration of 0.5 to 10 wt. %.

6. The method of claim 4 wherein the solvent is a $C_1$–$C_4$ alkyl alcohol.

7. The method of claim 1 wherein said amino compound is a polymer.

8. The method of claim 7 wherein the polymer is poly-4-ethenylpyridine, polyethylenimine or polyvinylimidozole.

9. The method of claim 1 wherein said membrane is in the form of a flat film or a tubular or hollow fiber.

10. The method of claim 1 wherein said membrane is heat-treated in said solution.

11. The method of claim 1 wherein said membrane is first immersed in said solution at room temperature heated at 25° to 120° C.

12. The method of claim 1 which further comprises heat-treating said membrane after removal from said solution.

13. A polyvinyl chloride (PVC) membrane of improved water flux properties made by the process of claim 1.

14. The method of claim 1 wherein the alkali alcoholate is $CH_3ONa$ or $C_2C_5ONa$.

* * * * *